US012803687B2

(12) United States Patent
Ye et al.

(10) Patent No.: US 12,803,687 B2
(45) Date of Patent: Nov. 17, 2026

(54) INTERFERENCE DETECTION METHOD AND APPARATUS, INTERFERENCE SUPPRESSION METHOD AND APPARATUS, AND STORAGE MEDIUM

(71) Applicant: ZTE Corporation, Shenzhen (CN)

(72) Inventors: Zhengzheng Ye, Shenzhen (CN); Ping Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 170 days.

(21) Appl. No.: 18/728,527

(22) PCT Filed: Mar. 23, 2023

(86) PCT No.: PCT/CN2023/083460
§ 371 (c)(1),
(2) Date: Jul. 12, 2024

(87) PCT Pub. No.: WO2023/185644
PCT Pub. Date: Oct. 5, 2023

(65) Prior Publication Data

US 2025/0080254 A1 Mar. 6, 2025

(30) Foreign Application Priority Data

Mar. 30, 2022 (CN) ......................... 202210326021.7

(51) Int. Cl.
*H04B 17/345* (2015.01)
*H04B 7/04* (2017.01)

(52) U.S. Cl.
CPC ....... *H04B 17/345* (2015.01); *H04B 7/04013* (2023.05)

(58) Field of Classification Search
CPC .. H04B 17/345; H04B 7/04013; H04W 24/08
(Continued)

(56) References Cited

U.S. PATENT DOCUMENTS 12,382,328 B2 * 8/2025 Wang ...................... H04L 5/001
2014/0018118 A1 * 1/2014 Hammarwall ......... H04J 11/005 455/501

(Continued)

FOREIGN PATENT DOCUMENTS

CN 102026275 A 4/2011
CN 104113892 A 10/2014

(Continued)

OTHER PUBLICATIONS

Liu, Fengwei; Nterference Measurement Method and Apparatus; (WO 2021163942 A1); Aug. 26, 2021; all pages, . (Year: 2021).*

(Continued)

*Primary Examiner* — Mahendra R Patel
(74) *Attorney, Agent, or Firm* — CANTOR COLBURN LLP

(57) ABSTRACT

Provided are an interference detection method and apparatus. The method comprises: sending an adjustment instruction to a controller on the basis of pre-acquired node information from the controller, wherein the controller is used for controlling network nodes, the node information comprises information of the network nodes, and the adjustment instruction is used for instructing the controller to adjust the working state of some network nodes comprised among the network nodes; sending an interference measurement instruction to a target terminal, wherein the interference measurement instruction is used for instructing the target terminal to measure the interference of the network nodes currently in the working state on the basis of information comprised in the interference measurement instruction; and acquiring the measurement result fed back by the target terminal, and determining an interference state between the network nodes on the basis of the measurement result.

15 Claims, 8 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2015/0326307 | A1* | 11/2015 | Sawai et al. | H04W 84/047 370/315 |
| 2018/0160372 | A1* | 6/2018 | Benjebbour et al. | H04W 72/23 |
| 2018/0299528 | A1* | 10/2018 | Cui | H04W 64/00 |
| 2019/0339687 | A1* | 11/2019 | Cella | B62D 15/0215 |
| 2020/0348662 | A1* | 11/2020 | Cella | G05B 13/028 |

FOREIGN PATENT DOCUMENTS

| | | | | |
|---|---|---|---|---|
| CN | 105979565 A | | 9/2016 | |
| CN | 106792736 A | | 5/2017 | |
| CN | 110603847 A | | 12/2019 | |
| RU | 2511222 C2 | | 4/2014 | |
| RU | 2668290 C2 | | 9/2018 | |
| RU | 2720256 C1 | | 4/2020 | |
| WO | WO-2015032071 A1 | * | 3/2015 | H04W 24/10 |
| WO | WO-2021163942 A1 | * | 8/2021 | H04W 72/12 |
| WO | WO-2022127499 A1 | * | 6/2022 | H04W 52/24 |
| WO | WO-2023156936 A1 | * | 8/2023 | H04W 52/243 |

OTHER PUBLICATIONS

Federal Service for Intellectual Property Search Report; PCT Application No. PCT/CN2023/083460; International Filing Date: Mar. 23, 2023; date of completion: Apr. 18, 2025; 4 pages.
Russian Office Action; Application No. 2024125373/07(056259); Filing Date: Mar. 23, 2023; Date of mailing: Apr. 25, 2025; 11 pages.
International Search Report for corresponding application PCT/CN2023/083460 filed on Mar. 23, 2023.; Mail date Jun. 28, 2023.
European Search Report for Application No. 23778013.5, dated Jun. 23, 2025, 5 pages.

* cited by examiner

| Measurement period | 0 | 1 | 2 | 3 | 4 | |
|---|---|---|---|---|---|---|
| RIS0 | 1 | 0 | 1 | 1 | 1 | …… |
| RIS1 | 1 | 1 | 0 | 1 | 1 | …… |
| RIS2 | 1 | 1 | 1 | 0 | 1 | …… |
| RIS3 | 1 | 1 | 1 | 1 | 0 | …… |

| Measurement period | 0 | 1 | 2 | 3 | 4 | |
|---|---|---|---|---|---|---|
| RIS0 | 1 | 0 | 1 | 0 | 1 | ······ |
| RIS5 | 0 | 1 | 0 | 1 | 0 | ······ |

INTERFERENCE DETECTION METHOD AND APPARATUS, INTERFERENCE SUPPRESSION METHOD AND APPARATUS, AND STORAGE MEDIUM

CROSS-REFERENCE TO RELATED APPLICATION

The disclosure is a national stage filing under 35 U.S.C. § 371 of international application number PCT/CN2023/083460, filed Mar. 23, 2023, which claims the priority to Chinese Patent Application No. 202210326021.7, filed with the Chinese Patent Office on Mar. 30, 2022, which is incorporated in its entirety herein by reference.

TECHNICAL FIELD

The embodiments of the present disclosure relate to the field of communications, and in particular, to an interference detection method and apparatus, an interference suppression method and apparatus, a storage medium, and an electronic device.

BACKGROUND

In the related art, interference may exist between some types of devices, such as interference between Reconfigurable Intelligent Surfaces (RIS), interference between Network-Controlled Repeater (repeater for short), etc. the RIS is taken as an example for description in the following: RIS is an artificial electromagnetic material having programmability electromagnetic characteristics. By controlling the phase of each array, the emergent beam can be controlled to be focused to a desired direction or point, thereby realizing the control of an electromagnetic environment. RIS may change and control the electromagnetic environment, but may introduce additional electromagnetic interference. Especially in a situation where a plurality of RISs are deployed at the same time, on the one hand, reflection and scattering are generated due to complexity of a wireless environment, and on the other hand, natural beams of the RISs themselves and base station beams have abundant side lobes, which may cause mutual interference, resulting in performance deterioration.

However, there is no effective method for detecting the described interference in the related art.

SUMMARY

Provided in the embodiments of the present disclosure are an interference detection method and apparatus, an interference suppression method and apparatus, a storage medium, and an electronic device, so as to at least solve the problem in the related art that interference between devices cannot be effectively detected.

According to an embodiment of the present disclosure, provided is an interference detection method, including: sending an adjustment instruction to a controller on the basis of pre-acquired node information from the controller, wherein the controller is used for controlling network nodes, the node information includes information of the network nodes, the adjustment instruction is used for instructing the controller to adjust the working state of some network nodes included among the network nodes on the basis of information included in the adjustment instruction, and the quantity of the network nodes is one or more: sending an interference measurement instruction to a target terminal, wherein the interference measurement instruction is used for instructing the target terminal to measure the interference of the network nodes currently in the working state on the basis of information included in the interference measurement instruction, so as to obtain a measurement result; and acquiring the measurement result fed back by the target terminal, and determining an interference state between the network nodes on the basis of the measurement result.

According to another embodiment of the present disclosure, provided is an interference suppression method, including: determining an interference state between network nodes controlled by a controller; determining, on the basis of the interference state, a plurality of target network nodes of which the interference correlation value exceeds a predetermined threshold; and performing, by the controller, interference suppression on the interference between the plurality of target network nodes.

According to another embodiment of the present disclosure, provided is an interference detection apparatus, including: a first sending module, configured to send an adjustment instruction to a controller on the basis of pre-acquired node information from the controller, wherein the controller is used for controlling network nodes, the node information includes information of the network nodes, the adjustment instruction is used for instructing the controller to adjust the working state of some network nodes included among the network nodes on the basis of information included in the adjustment instruction, and the quantity of the network nodes is one or more; a second sending module, configured to send an interference measurement instruction to a target terminal, wherein the interference measurement instruction is used for instructing the target terminal to measure the interference of the network nodes currently in the working state on the basis of information included in the interference measurement instruction, so as to obtain a measurement result; and a first determination module, configured to acquire the measurement result fed back by the target terminal, and determine an interference state between the network nodes on the basis of the measurement result.

According to another embodiment of the present disclosure, provided is an interference suppression apparatus, including: a second determination module, configured to determine an interference state between network nodes controlled by a controller; a third determination module, configured to determine, on the basis of the interference state, a plurality of target network nodes of which the interference correlation value exceeds a predetermined threshold; and an interference suppression module, configured to perform, by the controller, interference suppression on the interference between the plurality of target network nodes.

According to still another embodiment of the present disclosure, further provided is a computer readable storage medium, the computer readable storage medium storing a computer program, wherein the computer program is configured to execute the steps in any one of the described method embodiments when running.

According to still another embodiment of the present disclosure, further provided is an electronic device, including a memory and a processor, wherein the memory stores a computer program, and the processor is configured to run the computer program so as to execute the steps in any one of the described method embodiments.

DETAILED DESCRIPTION OF THE EMBODIMENTS

Hereinafter, the embodiments of the present disclosure will be described in detail with reference to the drawings and in conjunction with the embodiments.

It should be noted that, terms such as "first" and "second" in the description and the claims of the present disclosure and the described drawings are used to distinguish similar objects, but are not necessarily used to describe a specific sequence or order.

Figure 1:
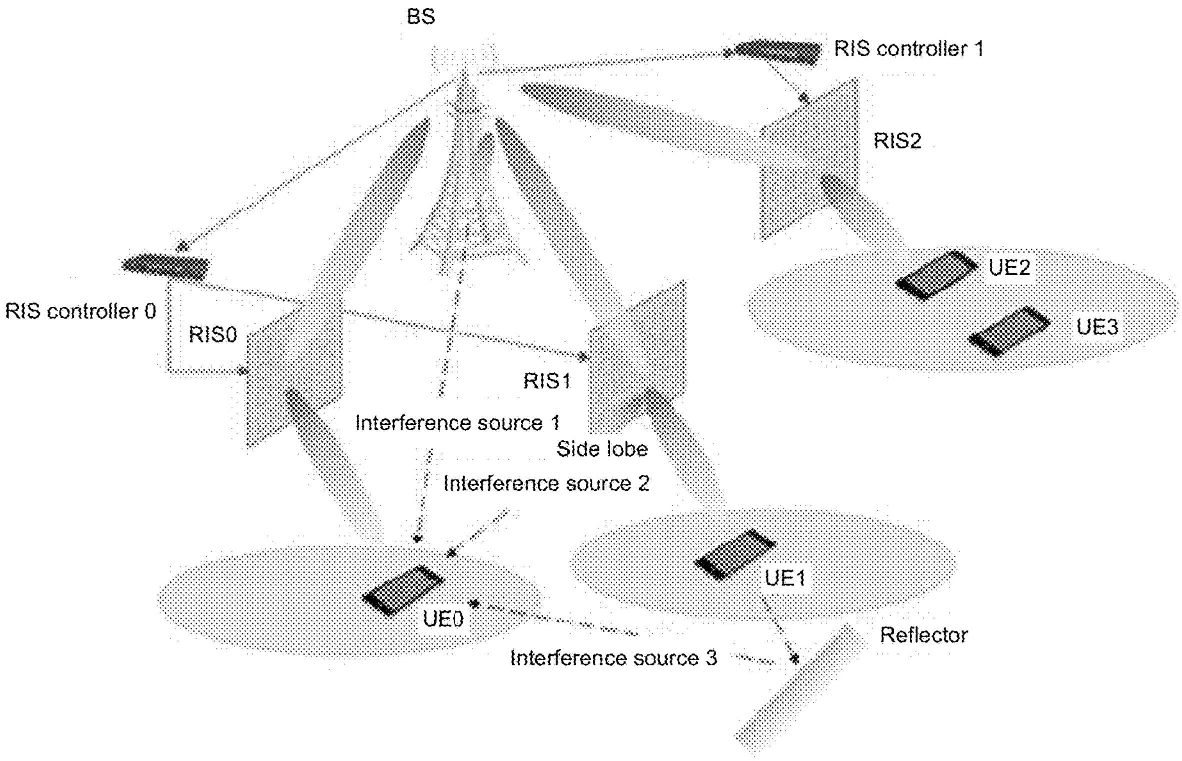
FIG. 1 is a schematic diagram of interference sources in a single-base station multi-RIS scenario in the related art.

First, an application scenario of the present disclosure is described:

The present disclosure is mainly applicable to a coverage enhancement scenario of a plurality of RISs (or repeaters, or other network nodes) managed by a single base station. By means of the methods such as the detection of RISs (or repeaters, or other network nodes) associated with a maximum interference source of all UE or RIS (or repeater, or other network node) coverage areas, and staggered arrangement of sending time-frequency resources, codebook switching, and mechanical adjustment of RIS panels (or repeaters, or other network nodes), interference suppression under coverage enhancement of a plurality of RISs (or repeaters, or other network nodes) is realized. Reference may be made to FIG. 1 for interference sources in a single-base station multi-RIS scenario.

Figure 2:
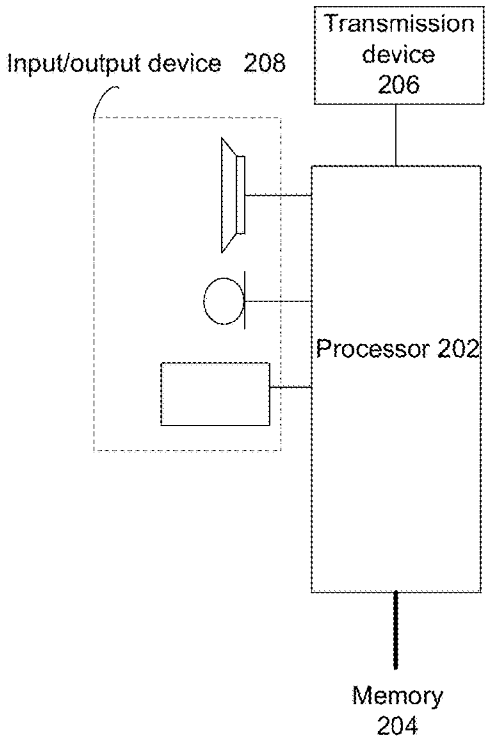
FIG. 2 is a hardware structural block diagram of a mobile terminal for an interference detection method or interference suppression method according to an embodiment of the present disclosure.

The present disclosure is described below with reference to the embodiments:

The method embodiments provided in the embodiments of the present disclosure may be implemented in a mobile terminal, a computer terminal, or a similar computing apparatus. Taking operation on a mobile terminal as an example. FIG. 2 is a hardware structural block diagram of a mobile terminal for an interference detection method or interference suppression method according to an embodiment of the present disclosure. As shown in FIG. 2, the mobile terminal may include one or more (only one is shown in FIG. 2) processors 202 (the processors 202 may include, but are not limited to, a processing apparatus such as a microprocessor MCU or a programmable logic device FPGA) and a memory 204 for storing data, wherein the mobile terminal may further include a transmission device 206 for a communication function, and an input/output device 208. A person of ordinary skill in the art may understand that the structure shown in FIG. 2 is merely exemplary, which does not limit the structure of the mobile terminal. For example, the mobile terminal may further include components more or less than that shown in FIG. 2, or have a configuration different from that shown in FIG. 2.

The memory 204 may be configured to store a computer program, for example, a software program and modules of application software, such as a computer program corresponding to the interference detection method or the interference suppression method in the embodiment of the present disclosure. The processor 202 executes various function applications and data processing by running the computer program stored in the memory 204, that is, the described method is implemented. The memory 204 may include a high-speed random access memory, and may also include a non-volatile memory, such as one or more magnetic storage apparatuses, flash memory, or other non-volatile solid-state memory. In some examples, the memory 204 may further include a memory configured remotely relative to the processor 202, and the remote memory may be connected to the mobile terminal over a network. Examples of the described network include, but are not limited to, the Internet, intranets, local area networks, mobile communication networks, and combinations thereof.

The transmission device 206 is configured to receive or transmit data via a network. Specific examples of the described network may include a wireless network provided by a communication provider of the mobile terminal. In an example, the transmission device 206 includes a Network Interface Controller (NIC) that may be connected to other network devices via a base station to communicate with the Internet. In an example, the transmission device 206 may be a Radio Frequency (RF) module configured to communicate wirelessly with the Internet.

Figures 3, 4:
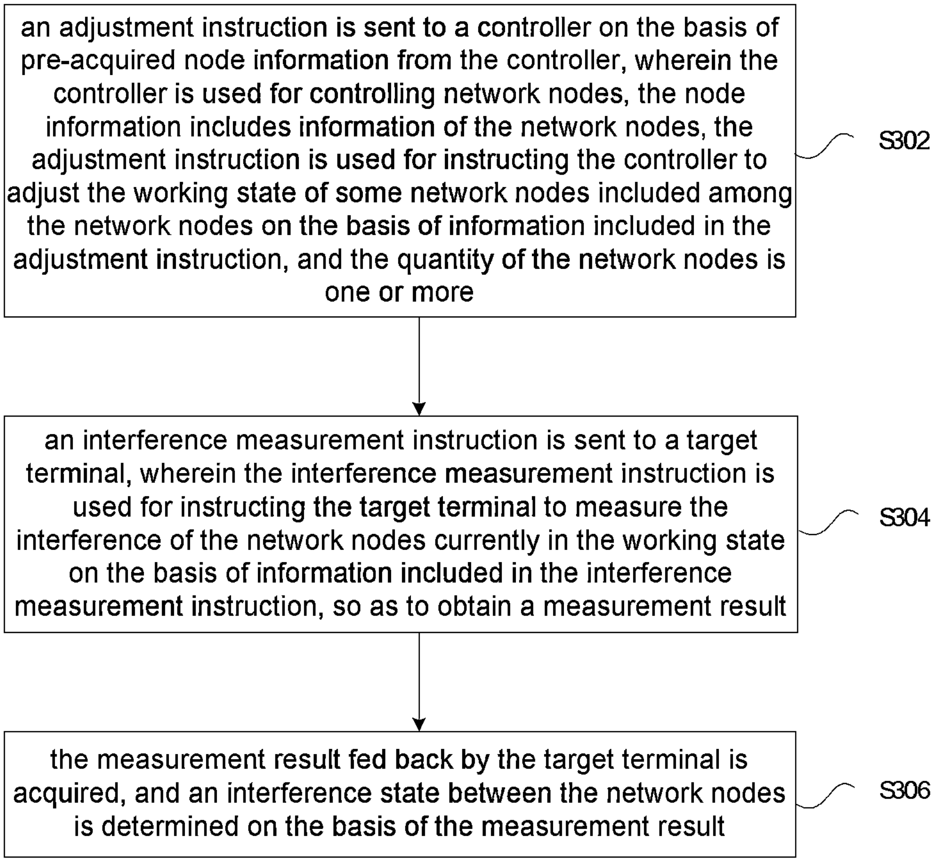
FIG. 3 is a flowchart of an interference detection method according to an embodiment of the present disclosure.
FIG. 4 is a schematic diagram of a switch-off period state of four RIS panels in an interference detection period according to an embodiment of the present disclosure.

FIG. 3 is a flowchart of an interference detection method according to an embodiment of the present disclosure. As shown in FIG. 3, the flow includes the following steps:

S302: an adjustment instruction is sent to a controller on the basis of pre-acquired node information from the controller, wherein the controller is used for controlling network nodes, the node information includes information of the network nodes, the adjustment instruction is used for instructing the controller to adjust the working state of some network nodes included among the network nodes on the basis of information included in the adjustment instruction, and the quantity of the network nodes is one or more;

S304: an interference measurement instruction is sent to a target terminal, wherein the interference measurement instruction is used for instructing the target terminal to measure the interference of the network nodes currently in the working state on the basis of information included in the interference measurement instruction, so as to obtain a measurement result; and

S306: the measurement result fed back by the target terminal is acquired, and an interference state between the network nodes is determined on the basis of the measurement result.

By means of the described steps, provided is an interference detection method. In the method, interference between network nodes can be detected by cooperating with a controller for controlling the network nodes and a terminal, thereby effectively realizing the purposes of interference detection between the network nodes and improving the accuracy rate of interference detection, and solving the problem in the related art that interference between devices cannot be effectively detected.

The entity for executing the described steps may be, but is not limited to, a base station, a processor or a processing module configured in the base station, or a processing device configured independently of the base station. The following description is given by taking a base station executing the described operations as an example:

In the described embodiment, the sending opportunity for sending the adjustment instruction to the controller may be the time when the base station determines that interference detection needs to be performed, and certainly, the adjustment instruction may also be sent periodically, or sent under the triggering of an instruction sent by another device, and so on. The controller can control the network nodes managed thereby on the basis of the content included in the received adjustment instruction; the target terminal can sequentially execute various detection operations on the basis of the received interference measurement instruction so as to obtain various detection results; and after receiving various measurement results reported by the target terminal, the base station can determine an interference state between a plurality of network nodes on the basis of the relationship (e.g. an increment, a decrement, etc.) between the various detection results. Namely, the base station can parse and calculate an interference detection increment of each interference statistical unit (i.e. the described target terminal), wherein the interference statistical unit includes a single UE currently served by the base station or the UE, as a whole, served by each RIS, and if it is the latter, statistics can be made according to a sum or an average value: with regard to a switch-off source and statistical unit pair (i.e. a plurality of RISs having interference) having an increment greater than a certain preset threshold, a currently switched-off RIS (or other types of network nodes, similarly in the following, which will not be repeated hereinafter) is recorded as an interference RIS of the statistical unit; and an interference correlation table of each statistical unit is maintained at the base station side to reflect an interference source of each statistical unit, and an interference RIS and an interference degree corresponding to each UE are recorded, wherein the interference degree is reflected by the interference detection increment. If the statistical unit is each RIS area, the base station collects the interference detection increments reported by all UEs in the RIS area.

The base station controls the switch-off of the RIS (i.e. controlling, by the controller, the RIS (or referred to as an RIS panel)) to detect whether each interference statistical unit is interfered by other RIS reflection signals. In order to avoid complexity and time waste caused by multiple sending and checking of interaction signaling, the base station sends switch-off period signaling to all RISs of a cell where the base station is located (i.e. being controlled by a controller), so as to control the RISs to be switched off and switched on in a specified measurement period.

In an alternative embodiment, considering that one controller may be connected to a plurality of RIS panels at the same time and a certain time interval is required for switching off and switching on, the adjustment instruction may include at least one piece of the following information:

the quantity of continuous frames or slots required in an interference detection period;

the frame number at the start of the interference detection period;

the serial number and the quantity of the network nodes which need to be switched on for detection;

a switching time interval of each of the network nodes controlled by the controller;

a codebook switching instruction of each of the network nodes controlled by the controller; and a switch-off period state of each of the network nodes controlled by the controller.

In the described embodiment, the switching time interval of each of the network nodes controlled by the controller can be determined according to at least one piece of information, such as a physical switch-off and switch-on delay of an RIS panel, and scheduling time sequence: the codebook switching instruction may include a codebook, a codebook identifier or a codebook serial number, etc.: with regard to the switch-off switching state, FIG. 4 shows a schematic diagram of a switch-off period state of four RIS panels in an interference detection period, wherein Time Pattern0 is a common measurement period, all RISs work normally, and each interference statistical unit (i.e. the described target terminal) measures and reports the interference statistical amount;

in Pattern1, RIS0 is switched off, and RIS1 to RIS3 respectively measure and report the interference statistics, and interference of RIS0 on other RISs is detected;

in Pattern2, RIS1 switched off, . . . .

In an alternative embodiment, the interference measurement instruction includes at least one piece of the following information: start time of interference measurement, a duration of interference measurement, measurement times of interference measurement, and end time of interference measurement.

In an alternative embodiment, acquiring the measurement result fed back by the target terminal includes: acquiring the measurement result fed back by the target terminal according to one of the following manners:

the target terminal separately reports a measurement result obtained after measuring the interference of each codebook of the network nodes on the target terminal;

the target terminal reports, in batches, measurement results obtained after measuring the interference of each codebook of the network nodes on the target terminal; and the target terminal reports, as a whole, a measurement result obtained after measuring the interference of each codebook of the network nodes on the target terminal.

In this embodiment, the target terminal may perform interference detection and reporting in cooperation with the base station and the RIS, and may feed back to the base station in a manner of separately reporting for each codebook, reporting in batches, or reporting as a whole for all codebooks. When performing interference measurement, the target terminal detects an SINR, a traffic volume (traffic volume of service data, or referred to as data throughput) or an RSRP, etc., and obtains the measurement result on the basis of the measurement operation.

In an alternative embodiment, sending the interference measurement instruction to the target terminal includes: sending the interference measurement instruction to the target terminal via one of the following signaling: a Channel State Information Reference Signal (CSI-RS), a Synchronization Signal Block (SSB), a Physical Downlink Shared Channel (PDSCH), and Media Access Control (MAC) signaling.

In an alternative embodiment, acquiring the measurement result fed back by the target terminal includes: acquiring the measurement result fed back by the target terminal via one of the following signaling: a Channel Sounding Reference Signal (SRS), a Physical Downlink Shared Channel (PUSCH), and a Media Access Control (MAC).

In an alternative embodiment, before sending the adjustment instruction to the controller on the basis of the pre-acquired node information from the controller, the method further includes: sending a broadcast signal; and receiving the node information fed back by the controller on the basis of the broadcast signal. In this embodiment, the broadcast signal may be sent when a cell is initially accessed, may also be sent periodically, or may be triggered upon receipt of other signaling. The node information may be collected and reported by the controller upon receipt of the broadcast signal, may also be fed back periodically by the controller, or may be reported after the controller confirms that information changes occur in a controlled network node.

In an alternative embodiment, the broadcast signal includes at least one of the following:

- a signaling flag for indicating network node-dedicated control signaling;
- at least one of a control signaling sending period, a sending interval and a sending slot;
- a switch-on and/or switch-off instruction of the network nodes; and
- a cell identifier (ID).

In an alternative embodiment, sending the broadcast signal includes:

- sending the broadcast signal via one of the following signaling;
- a Synchronization Signal Block (SSB), and paging.

In an alternative embodiment, receiving the node information fed back by the controller on the basis of the broadcast signal includes:

- receiving the node information fed back by the controller via one of the following signaling;
- a Random Access Channel (RACH), Radio Resource Control (RRC) signaling, Media Access Control (MAC) signaling, and UE capability signaling.

In an alternative embodiment, the node information includes at least one of the following:

- the quantity of network nodes controlled by the controller;
- the serial number of each of the network nodes;
- the type of each of the network nodes;
- the current working state of each of the network nodes;
- the activation state of each of the network nodes;
- configuration information of each of the network nodes;
- deployment information of each of the network nodes;
- performance information of each of the network nodes; and
- a unique identification of each of the network nodes.

In the described embodiment, the type of the network nodes may include one of the following states: static state (including a state in which information such as a codebook cannot be changed), semi-static state, dynamic state (information such as a codebook can be changed in a semi-static state and dynamic state), etc.; the current working state of the network nodes may include at least one of the following: whether a switch, a beam codebook ID, a power supply or control unit (i.e. a unit used for supplying power to a network unit or controlling a network unit, which may be located on the network unit, and may also be configured independently of the network unit), or a panel array is abnormal, etc.; the activation state of the network nodes includes at least one of the following: reflection and transmission: the configuration information of the network nodes includes at least one of the following: the quantity of horizontal and vertical arrays, the configured polarization quantity, the quantity of bits, the area of a panel, etc.; the deployment information of the network nodes includes at least one of the following: height, deployment coordinates, a downtilt angle and a horizontal angle, a rotation angle of a panel relative to a normal line, etc.; and the performance information of the network nodes includes at least one of the following: a codebook switching time interval, a codebook validity delay, a maximum quantity of stored codebooks, etc.

In an alternative embodiment, after determining an interference state between the network nodes on the basis of the measurement result, the method further includes: determining, on the basis of the interference state, a plurality of target network nodes of which the interference correlation value exceeds a predetermined threshold; and performing, by the controller, interference suppression on the interference between the plurality of target network nodes. In this embodiment, an interference state (or an interference value) between various network nodes can be determined on the basis of various measurement results reported by the target terminal, so that an interference network node can be determined, and interference suppression can be performed on the interference network node, thereby reducing interference between the network nodes. In the embodiment of the present disclosure, there are a plurality of interference suppression modes, and the suppression modes will be described below:

In an alternative embodiment, performing, by the controller, interference suppression on the interference between the target network nodes includes at least one of the following:

- Mode 1: controlling, by the controller, the plurality of target network nodes to work at different times;
- Mode 2: controlling, by the controller, some target network nodes included among the plurality of target network nodes to perform codebook switching; and
- Mode 3: adjusting, by the controller, physical parameters of some target network nodes included among the plurality of target network nodes.

Figure 5:
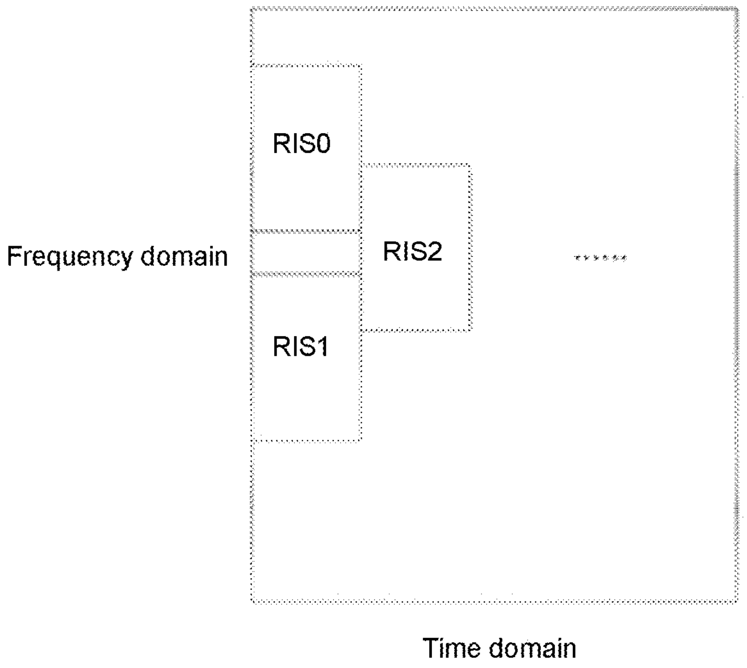
FIG. 5 is a schematic diagram of staggered arrangement of time-frequency resources between interference RISs according to an embodiment of the present disclosure.

In the described embodiment, Mode 1 can also be referred to as time-frequency resource staggered arrangement mode: taking RISs (or referred to as RIS panels) being the network nodes as an example, in this mode, for an RIS (i.e. the described target network node) which is strongly correlated with interference, sending can be performed on different times or frequency resources. When mapping sending signal resources, a base station divides time-frequency resources into blocks, and fills time-frequency resources of a UE under interference paired RIS. The base station may directly issue a switch-off period instruction to one or more RIS controllers to control interference RISs to work at different times, wherein reference can be made to FIG. 5 for a schematic diagram of staggered arrangement of time-frequency resources between interference RISs.

In an alternative embodiment, Mode 2 may also be referred to as a codebook switching mode; taking RISs (or referred to as RIS panels) being the network nodes as an example, in this mode, at least one of the following modes may be used for implementation:

- codebook switching mode 1: sending a first codebook adjustment instruction to the controller, so as to instruct the controller to control some target network nodes included among the plurality of target network nodes to perform codebook switching; and
- codebook switching mode 2: sending codebook scanning set signaling to the controller, so as to instruct the controller to perform codebook scanning on the plurality of target network nodes in a scanning mode indicated by the codebook scanning set signaling; determining, on the basis of a scanning result reported by the controller, a target codebook to which some target network nodes included among the plurality of target network nodes are to be switched; and sending a second codebook adjustment instruction to the controller, so as to instruct the controller to control some target network nodes included among the plurality of target network nodes to be switched to the target codebook. In the codebook switching mode, the codebook scanning set signaling contains an adjustable codebook set, a scanning period start time and duration, etc., and the RIS controller performs codebook scanning: during this period, the base station continuously measures an interference detection amount reported by the interference statistical unit and determines an optimal adjustment codebook; and thereafter, the base station issues a codebook adjustment instruction to the RIS controller, so that the corresponding RIS panel performs codebook switching.

In the described codebook switching mode, with regard to codebook switching of an interference RIS, on the premise that the main lobe direction capability attenuation is less than a certain threshold, the energy of an emergent beam pattern of the RIS at a specific angle is attenuated, thereby reducing the interference to a target area. In this scheme, a relative angle and a coordinate relationship between various RISs need to be predicted, and a codebook may be calculated and issued by a base station in real time, or may be preset in a codebook storage borne on an RIS panel, loaded by delivering a codebook serial number, and placed in codebook adjustment signaling.

In an alternative embodiment, the first codebook adjustment instruction and/or the second codebook adjustment instruction is sent via at least one of the following signaling: a Physical Downlink Shared Channel (PDSCH), a Media Access Control Control Element (MAC CE), Radio Resource Control (RRC) signaling, and a control plane-dedicated instruction.

In an alternative embodiment. Mode 3 may also be referred to as a mechanical adjustment mode, wherein adjusting, by the controller, physical parameters of some target network nodes included among the plurality of target network nodes includes: sending a mechanical adjustment instruction to the controller, so as to instruct the controller to adjust physical parameters of some target network nodes included among the plurality of target network nodes, wherein the mechanical adjustment instruction includes at least one of the following: the serial number and the quantity of the target network nodes which need to be adjusted; at least one of the following adjustment amounts of each of the target network nodes to be adjusted; a downtilt angle adjustment amount, a horizontal angle adjustment amount, a rotation angle adjustment amount relative to a normal line, and a height adjustment amount; and at least one of the following parameters of each of the target network nodes: an array activation state (including reflection, transmission; activation, non-activation, etc.), an array activation state quantity, and an array activation form. The mechanical adjustment instruction can be used for coverage performance optimization or beam adjustment. Taking RISs (or referred to as RIS panels) being the network nodes as an example, in this mode, a downtilt angle, a horizontal angle, a height, etc. of an interference RIS are changed by means of mechanical adjustment, so that a main lobe reflection signal or a side lobe signal of the interference RIS cannot interfere a target area, thereby realizing interference suppression. This is achieved by the base station issuing a mechanical adjustment instruction to the interference RIS (i.e. adjusting mechanical parameters of the RIS by means of the RIS controller).

In an alternative embodiment, the network nodes may include one of the following: a Reconfigurable Intelligent Surface (RIS), and a Network-Controlled Repeater (repeater for short).

Figure 6:
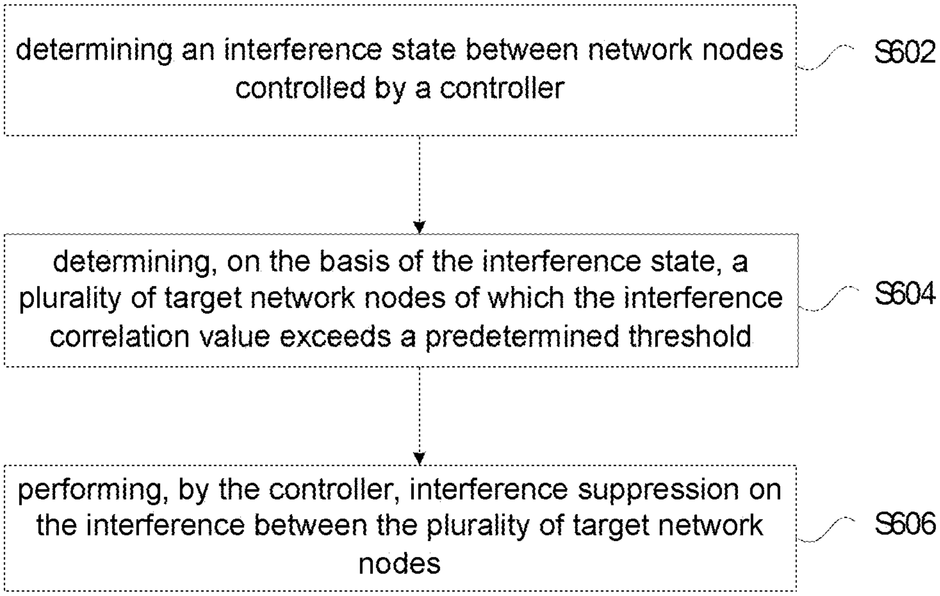
FIG. 6 is a flowchart of an interference detection method according to an embodiment of the present disclosure.

Further provided in the embodiment of the present disclosure is an interference suppression method. FIG. 6 is a flowchart of an interference detection method according to an embodiment of the present disclosure. As shown in FIG. 6, the flow includes the following steps:

- S602: determining an interference state between network nodes controlled by a controller;
- S604: determining, on the basis of the interference state, a plurality of target network nodes of which the interference correlation value exceeds a predetermined threshold; and
- S606: performing, by the controller, interference suppression on the interference between the plurality of target network nodes.

In an alternative embodiment, performing, by the controller, interference suppression on the interference between the target network nodes includes at least one of the following:

- controlling, by the controller, the plurality of target network nodes to work at different times;
- controlling, by the controller, some target network nodes included among the plurality of target network nodes to perform codebook switching; and
- adjusting, by the controller, physical parameters of some target network nodes included among the plurality of target network nodes.

In an alternative embodiment, controlling, by the controller, some target network nodes included among the plurality of target network nodes to perform codebook switching includes:

- sending a first codebook adjustment instruction to the controller, so as to instruct the controller to control some target network nodes included among the plurality of target network nodes to perform codebook switching; or,
- sending codebook scanning set signaling to the controller, so as to instruct the controller to perform codebook scanning on the plurality of target network nodes in a scanning mode indicated by the codebook scanning set signaling; determining, on the basis of a scanning result reported by the controller, a target codebook to which some target network nodes included among the plurality of target network nodes are to be switched; and sending a second codebook adjustment instruction to the controller, so as to instruct the controller to control some target network nodes included among the plurality of target network nodes to be switched to the target codebook.

In an alternative embodiment, the first codebook adjustment instruction and/or the second codebook adjustment instruction is sent via at least one of the following signaling:

a Physical Downlink Shared Channel (PDSCH), a Media Access Control Control Element (MAC CE), Radio Resource Control (RRC) signaling, and a control plane-dedicated instruction.

In an alternative embodiment, adjusting, by the controller, physical parameters of some target network nodes included among the plurality of target network nodes includes: sending a mechanical adjustment instruction to the controller, so as to instruct the controller to adjust physical parameters of some target network nodes included among the plurality of target network nodes, wherein the mechanical adjustment instruction includes at least one of the following: the serial number and the quantity of the target network nodes which need to be adjusted; at least one of the following adjustment amounts of each of the target network nodes to be adjusted; a downtilt angle adjustment amount, a horizontal angle adjustment amount, a rotation angle adjustment amount relative to a normal line, and a height adjustment amount; and at least one of the following parameters of each of the target network nodes: an array activation state, an array activation state quantity; and an array activation form.

In an alternative embodiment, the network nodes may include one of the following: a Reconfigurable Intelligent Surface (RIS), and a Network-Controlled Repeater (repeater for short).

The present disclosure is described below with reference to the specific embodiments by taking RISs being the network nodes as an example:

SPECIFIC EMBODIMENT 1

Figure 7:
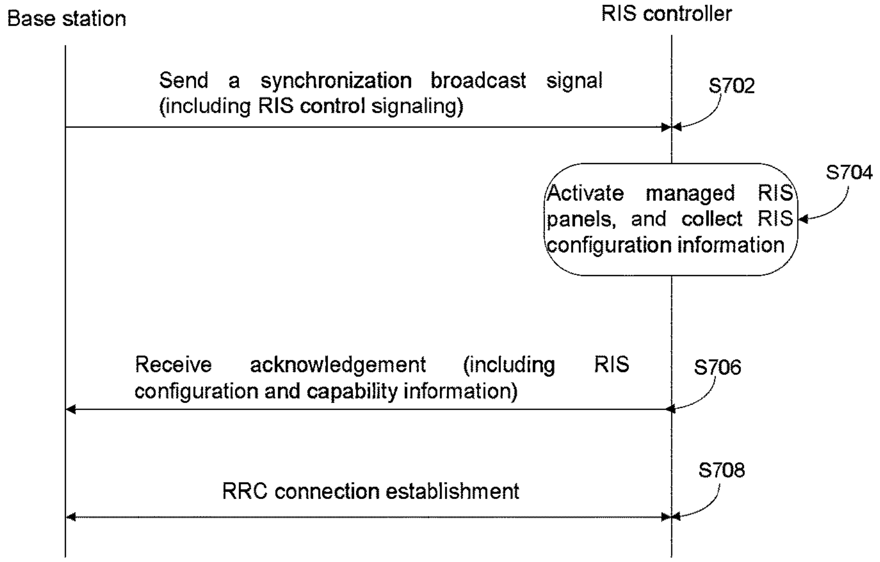
FIG. 7 is a schematic diagram of a process of establishing a connection between a base station and a RIS controller according to an embodiment of the present disclosure.

The process of establishing a connection between a base station and an RIS controller is shown in FIG. 7, wherein the RIS controller may be in the case of a single control plane controlling a plurality of reflection planes. The process includes the following steps:

S702: a base station sends a synchronization broadcast signal (corresponding to the described broadcast signal) to an RIS controller, wherein the synchronization broadcast signal can be issued via an SSB channel or paging signaling, and contains one or more of the following:

an RIS signaling flag for the RIS controller to parse whether the signaling is RIS-dedicated control signaling;

an RIS control signaling sending period/interval, the quantity of slots, etc.;

an RIS switch-on/switch-off instruction; and a cell ID;

S704: the RIS controller activates currently managed RIS panels, wherein one controller may simultaneously control a plurality of RIS panels, so as to collect configuration information and state information of all the managed RIS panels;

S706: the RIS controller performs feedback via RACH, RRC signaling, MAC signaling or UE capability signaling, wherein the transmitted content includes one or more of the following: the quantity of RIS panels;

the corresponding serial number of each RIS panel;

the type of each RIS panel, including static state, semi-static state, dynamic state, etc.;

the current working state of each RIS panel, including whether a switch, a beam codebook ID, a power supply or control unit, or a panel array is abnormal, etc.;

the activation state of each RIS panel, including reflection, transmission, etc.;

configuration information of each RIS panel, including the quantity of horizontal and vertical arrays, the configured polarization quantity, the quantity of bits, the area of a panel, etc.;

deployment information of each RIS panel, including height, deployment coordinates, a downtilt angle and a horizontal angle, a rotation angle of a panel relative to a normal line, etc.;

performance information of each RIS panel, including a codebook switching time interval, a codebook validity delay, a maximum quantity of stored codebooks, etc.; and a unique identification flag for each RIS panel;

S708: the RIS controller determines, according to the instruction of the gNB (i.e. the described base station), whether an RRC connection needs to be established with the gNB for the current access, and if the gNB instructs to perform the current access normally, the RIS controller continues to complete the RRC establishment process after the random access is completed.

SPECIFIC EMBODIMENT 2

This embodiment describes interference detection of a plurality of RISs under a single base station, and collection of interference-correlated RISs and interference degrees of interference statistical units.

Figure 8:
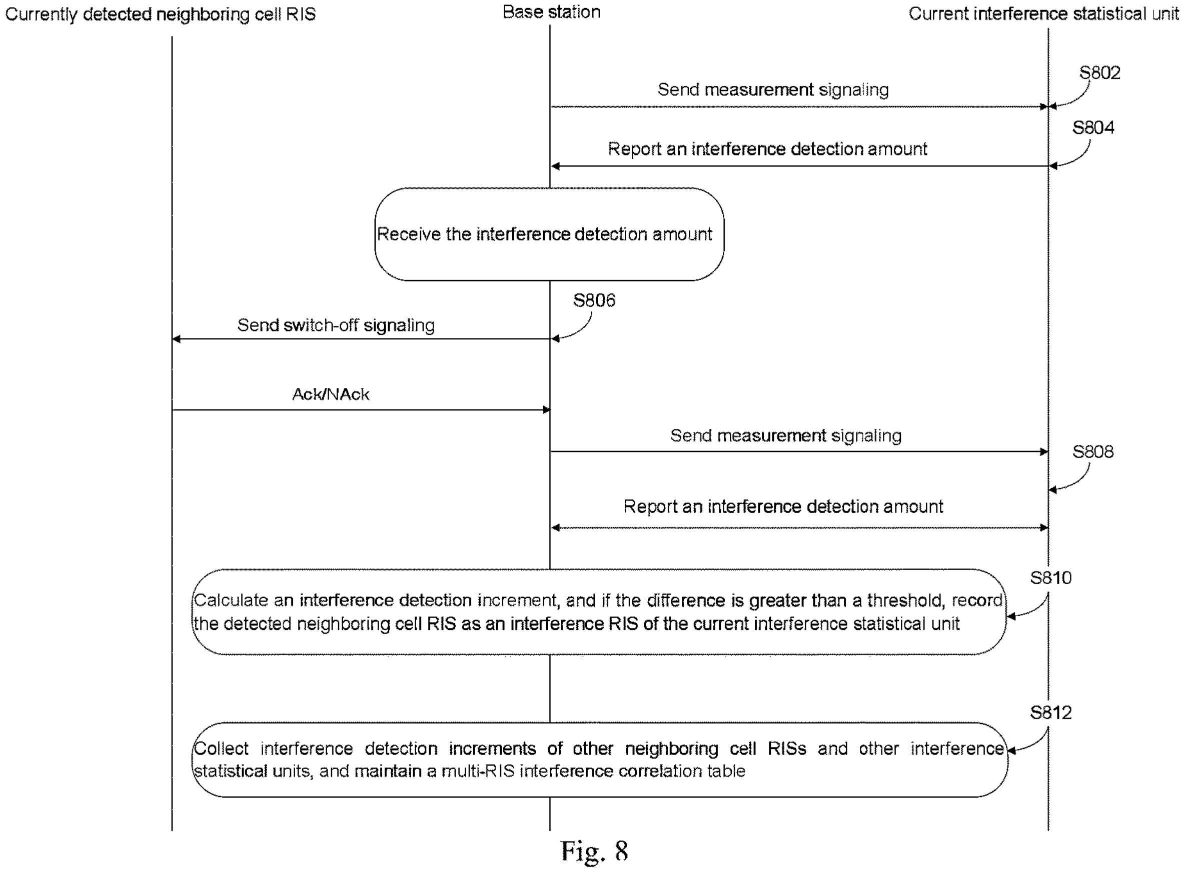
FIG. 8 is a flowchart of a base station issuing switch-off signaling to a plurality of RISs for a plurality of times according to an embodiment of the present disclosure.

Mode 1: a base station issues switch-off signaling to a plurality of RISs for a plurality of times, the flow is as shown in FIG. 8, including the following steps:

S802: when all RISs under a current base station work normally, the base station issues measurement signaling (corresponding to the described interference measurement instruction) to a current interference statistical unit, which can be realized by means of CSI-RS, SSB, PDSCH or MAC signaling, including start time, a duration, measurement times, end time, etc. of interference measurement: a UE may perform interference detection and reporting in cooperation with the base station and the RISs, and may feed back to the base station in a manner of separately reporting for each codebook, reporting in batches, or reporting as a whole for all codebooks;

S804: the current interference statistical unit reports the interference detection amount, including an SINR, or a traffic volume or an RSRP;

S806: the base station sends switch-off signaling (corresponding to the described adjustment instruction) to the currently detected neighboring cell RIS, so as to enable same to stop working;

S808: the base station re-sends measurement signaling to the current interference statistical unit and receives the report of the interference detection amount;

S810: the base station calculates an interference detection increment according to the difference between two interference detection amounts, and if the difference is greater than a threshold, records the detected neighboring cell RIS as an interference RIS of the current interference statistical unit, and records the interference RIS and the interference detection increment in a multi-RIS interference correlation table, wherein an example of the interference correlation table is as shown in FIG. 6;

S812: the base station respectively collects interference detection increments of other neighboring cell RISs and other interference statistical units, and maintains the multi-RIS interference correlation table, wherein reference can be made to Table 1 for the multi-RIS interference correlation table:

TABLE 1

| RIS0/UE0 | | RIS1/UE1 | | . . . | |
|---|---|---|---|---|---|
| Interference RIS | Interference correlation value | Interference RIS | Interference correlation value | Interference RIS | Interference correlation value |
| RIS1 | 5 dB | RIS2 | 6 dB | . . . | . . . |
| RIS2 | 3 dB | RIS5 | 4 dB | . . . | . . . |
| RIS5 | 8 dB | | | . . . | . . . |

Mode 2: a switch-off period instruction is used to control switch off and switch on of a plurality of RISs in a period.

Figure 9:
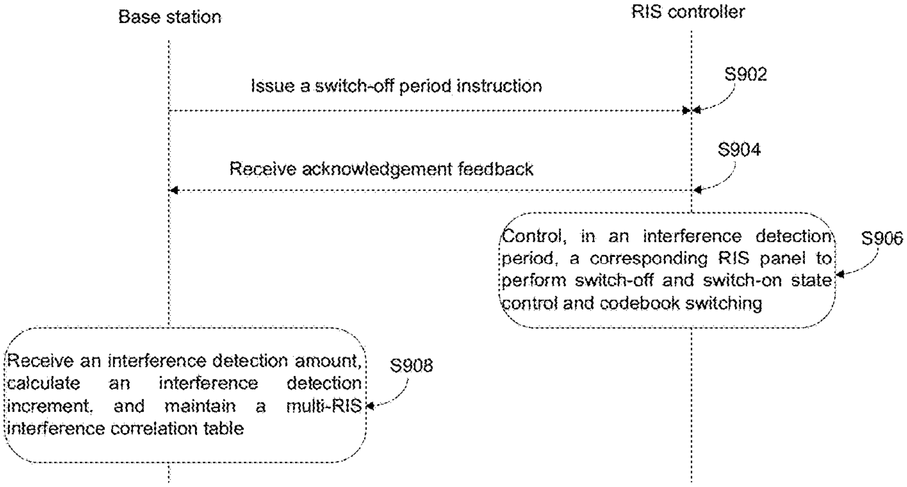
FIG. 9 is a flowchart of RIS interference detection using a switch-off period instruction according to an embodiment of the present disclosure.

The flow of RIS interference detection using the switch-off period instruction is shown in FIG. 9, including the following steps:

S902: a base station issues a switch-off period instruction (corresponding to the described adjustment instruction) to an RIS controller, including one or more of the following:

the quantity of continuous frames or slots required in an interference detection period;

the frame number at the start of the interference detection period;

the serial number and the quantity of the RIS panels which need to be switched on for detection;

a switching time interval of each RIS panel under the current controller, which is determined according to a physical switch-off and switch-on delay of an RIS panel, scheduling time sequence, etc.;

a codebook switching instruction of each RIS panel, including a codebook or a codebook serial number; and the switch-off period state of each RIS panel.

S904: the RIS controller, upon successful receipt and parsing, sends a receive acknowledgement feedback, and performs retransmission if the base station does not receive the feedback;

S906: the RIS controller controls, according to the instruction of the switch-off period instruction, a specified RIS panel to be switched off and switched on in the corresponding period time, including state control and codebook switching;

S908: after the interference detection period ends, the base station collectively parses the interference statistical amount of each interference statistical unit, compares same with the measured amount in a common measurement period to calculate an interference statistical increment, records an interference RIS source and correlation value of each interference statistical unit, and records and maintains the multi-RIS interference correlation table.

SPECIFIC EMBODIMENT 3

This embodiment describes performing interference suppression after the interference correlation table has been generated and maintained at the base station side.

This embodiment mainly describes scheme 1: interference suppression mode of staggered arrangement of time-frequency resources.

Figure 10:
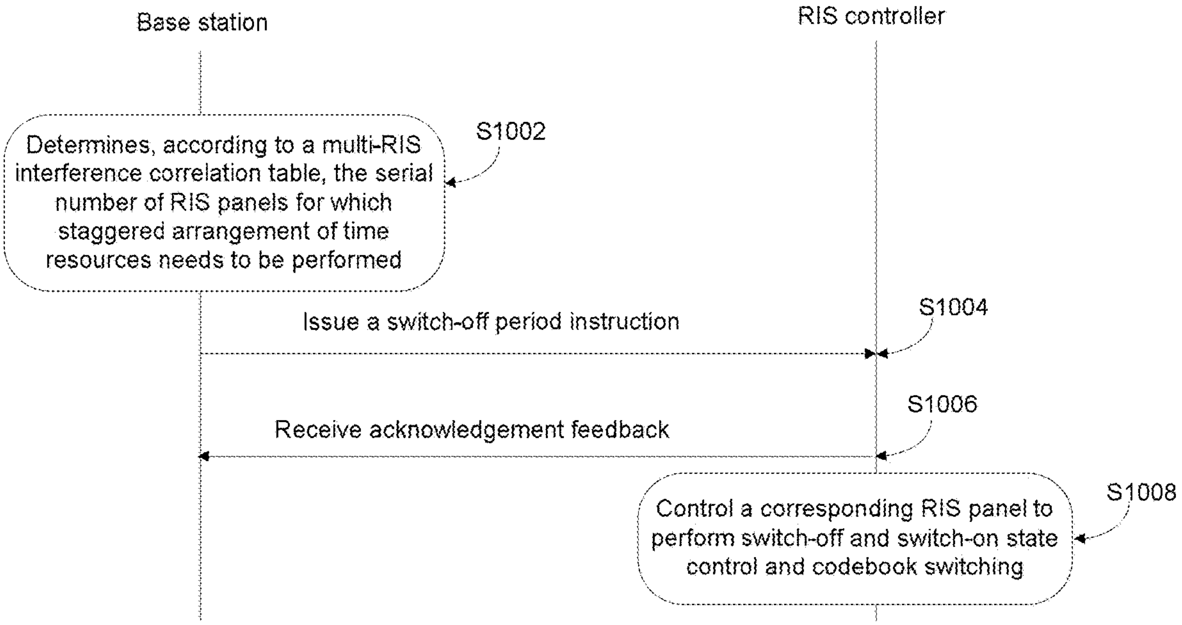
FIG. 10 is a flowchart of performing staggered arrangement of time-frequency resources using a switch-off period instruction according to an embodiment of the present disclosure.
Figures 11, 12:
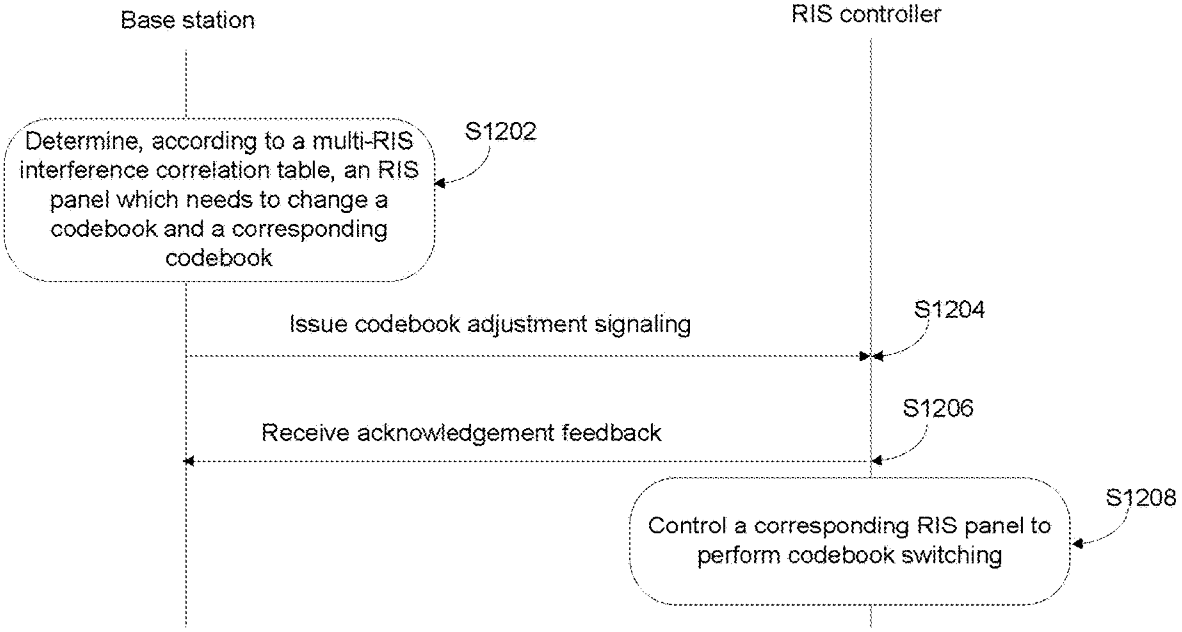
FIG. 11 is a schematic diagram of a switch-off period state sent from a base station to a plurality of RISs according to an embodiment of the present disclosure.
FIG. 12 is a flowchart of codebook switching interference suppression mode 1 according to an embodiment of the present disclosure.

According to the interference correlation table maintained at the base station side, paired interference RISs (corresponding to the described target network nodes) are selected, and one or more RISs having the maximum interference correlation value may be selected from the interference RISs under each RIS for performing staggered arrangement of time-frequency resources. The base station may directly issue switch-off period signaling to one or more RIS controllers to control interference RISs to work at different times, and the flowchart of performing staggered arrangement of time-frequency resources using a switch-off period instruction is shown in FIG. 10. The flow includes the following steps:

S1002: a base station determines, according to a maintained multi-RIS interference correlation table, the serial number of RIS panels for which staggered arrangement of time resources needs to be performed, wherein one or more RISs having the maximum interference correlation value may be selected to perform staggered arrangement of resources, and the base station issues an instruction to a corresponding controller;

S1004: the base station issues a switch-off period instruction to the RIS controller, including one or more of the following;

the quantity of continuous frames or slots required in the current switch-off period;

the frame number at the start of the switch-off period;

the serial number and the quantity of the RIS panels for which switch-off control needs to be performed;

a switching time interval of each RIS panel under the current controller, which is determined according to a physical switch-off and switch-on delay of an RIS panel, scheduling time sequence, etc.;

a codebook switching instruction of each RIS panel, including a codebook or a codebook serial number; and the switch-off period state of each RIS panel, assuming that staggered arrangement of time resources needs to be performed for RIS0 and RIS5, an example of the switch-off period state sent from the base station to a plurality of RISs may be shown in FIG. 11.

S1006: the RIS controller, upon successful receipt and parsing, sends a receive acknowledgement feedback, and performs retransmission if the base station does not receive the feedback;

S1008: the RIS controller controls, according to the parsed switch-off period instruction, a corresponding RIS panel to perform switch-off and switch-on state control and codebook switching in the corresponding period.

SPECIFIC EMBODIMENT 4

This embodiment describes performing interference suppression after the interference correlation table has been generated and maintained at the base station side.

This embodiment mainly describes scheme 2: interference suppression mode of codebook switching:

There are two codebook switching modes, and the flowchart of codebook switching interference suppression mode 1 is shown in FIG. 12, including the following steps:

S1202: a base station performs interference RIS pairing according to a multi-RIS interference correlation table, and determines an RIS panel which needs to change a codebook and a corresponding switching codebook;

S1204: the base station issues codebook adjustment signaling to an RIS controller, including a codebook or a codebook serial number, wherein the codebook may be preset in a codebook storage borne on an RIS panel, and is loaded by delivering the codebook serial number. The codebook adjustment signaling may be issued via a PDSCH, a MAC CE, RRC signaling or an RIS control plane-dedicated instruction.

S1206: the RIS controller, upon successful receipt and parsing, sends a receive acknowledgement feedback, and performs retransmission if the base station does not receive the feedback;

S1208: the RIS controller controls, according to the codebook adjustment signaling, a corresponding RIS panel to perform codebook switching.

Figure 13:
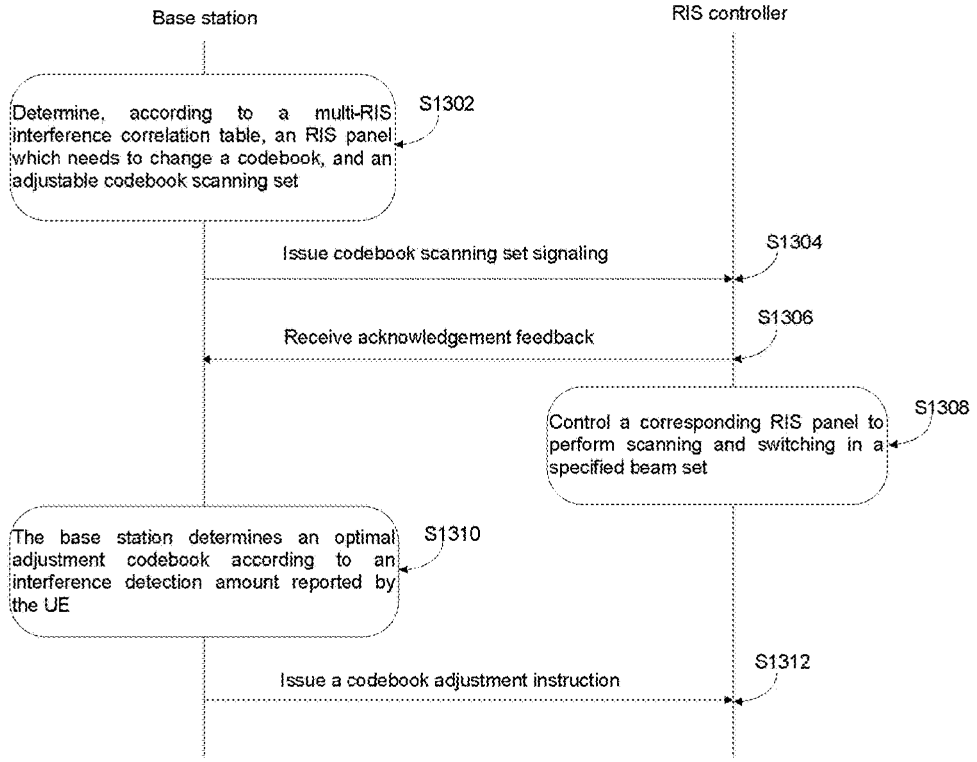
FIG. 13 is a flowchart of codebook switching interference suppression mode 2 according to an embodiment of the present disclosure.

The flowchart of codebook switching interference suppression mode 2 is shown in FIG. 13, including the following steps:

S1302: a base station performs interference RIS pairing according to a multi-RIS interference correlation table, determines an RIS panel which needs to change a codebook, and determines an adjustable codebook scanning set thereof;

S1304: the base station issues codebook scanning set signaling to an RIS controller, including a codebook set which can be adjusted by RISs under the RIS controller, a scanning period start time and duration, etc.: the base station issues interference measurement signaling to a UE, including start time, a duration, measurement times, end time, etc. of interference measurement: the UE may perform interference detection and reporting in cooperation with the base station and the RISs, and may feed back to the base station in a manner of separately reporting for each codebook, reporting in batches, or reporting as a whole for all codebooks;

S1306: the RIS controller, upon successful receipt and parsing, sends a receive acknowledgement feedback, and performs retransmission if the base station does not receive the feedback;

S1308: the RIS controller controls a corresponding RIS panel to perform codebook scanning and switching in a specified beam set;

S1310: the base station determines an optimal adjustment codebook according to an interference statistical amount reported by the UE;

S1312: the base station issues a codebook adjustment instruction to the RIS controller, so that a specified RIS panel is adjusted to the scanned optimal beam codebook.

SPECIFIC EMBODIMENT 5

This embodiment describes performing interference suppression after the interference correlation table has been generated and maintained at the base station side.

Figure 14:
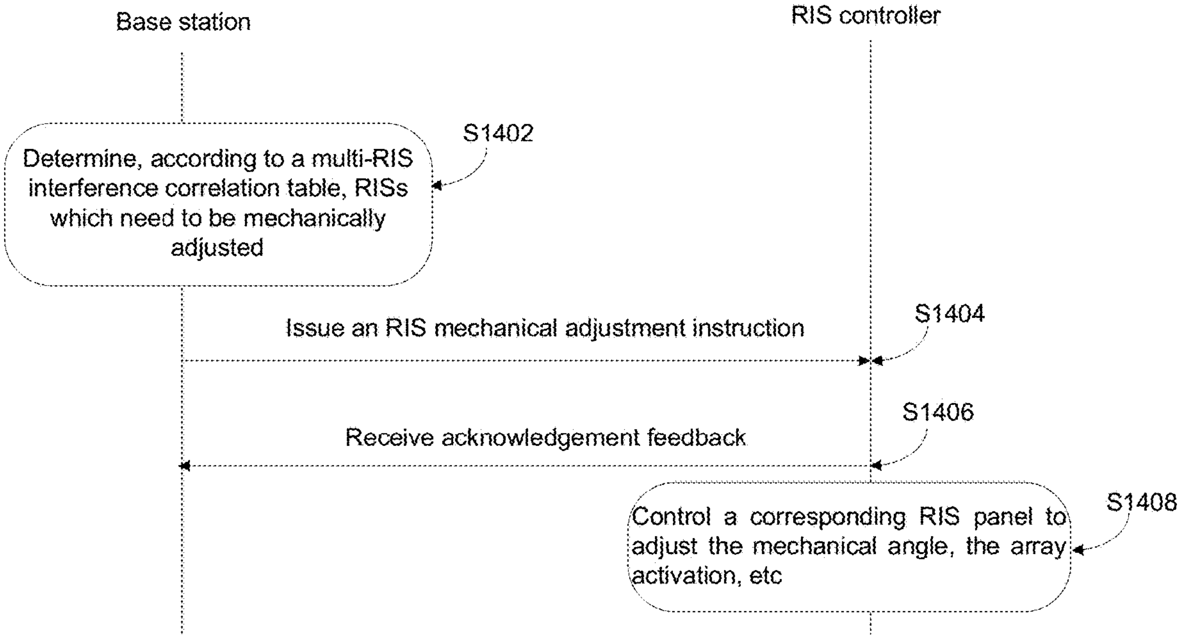
FIG. 14 is a flowchart of interference suppression using RIS mechanical adjustment according to an embodiment of the present disclosure.

This embodiment mainly describes scheme 3: interference suppression mode of mechanical adjustment of RIS panels:

A downtilt angle, a horizontal angle, a height, etc. of an interference RIS are changed by means of mechanical adjustment, so that a main lobe reflection signal or a side lobe signal of the interference RIS cannot interfere a target area, thereby realizing interference suppression. The flowchart of interference suppression using RIS mechanical adjustment is shown in FIG. 14, including the following steps:

S1402: a base station determines, according to a multi-RIS interference correlation table, RIS panels which need to be mechanically adjusted;

S1404: the base station issues an RIS mechanical adjustment instruction to a corresponding RIS controller, wherein the RIS mechanical adjustment instruction may be issued via RRC signaling, MAC signaling, a physical channel or an RIS control plane-dedicated instruction, including one or more of the following;

the serial number and the quantity of the RIS panels which need to be adjusted;

a downtilt angle adjustment amount and a horizontal angle adjustment amount of each RIS panel to be adjusted, and a rotation angle adjustment amount of an RIS panel relative to a normal line;

a height adjustment amount of each RIS panel;

an array activation state (including reflection, projection; activation, non-activation, etc.) and quantity, and an array activation form of each RIS panel;

in addition, the signaling may also be used in scenarios involving mechanical adjustment of RIS panels, such as coverage performance optimization or beam adjustment.

S1406: the RIS controller, upon successful receipt and parsing, sends a receive acknowledgement feedback, and performs retransmission if the base station does not receive the feedback;

S1408: the RIS controller controls, according to the RIS mechanical adjustment instruction, a corresponding RIS panel to adjust the mechanical angle, the array activation quantity and form, etc.

From the description of the described embodiments, a person skilled in the art may clearly understand that the methods according to the described embodiments may be implemented by software and a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and includes several instructions for causing a terminal device (which may be a mobile phone, a computer, a server, or a network device) to execute the methods described in the embodiments of the present disclosure.

Further provided in this embodiment is an interference detection apparatus, which is configured to implement the described embodiments and preferred implementations, and what has been described will not be described herein again.

The term "module", as used hereinafter, is a combination of software and/or hardware capable of realizing a predetermined function. Although the apparatus described in the following embodiment is preferably implemented by software, implementation by hardware or a combination of software and hardware is also possible and conceived.

Figure 15:
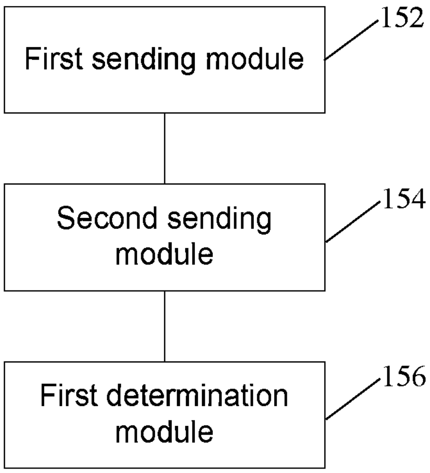
FIG. 15 is a structural block diagram of an interference detection apparatus according to an embodiment of the present disclosure.

FIG. 15 is a structural block diagram of an interference detection apparatus according to an embodiment of the present disclosure. As shown in FIG. 15, the apparatus includes:

a first sending module 152, configured to send an adjustment instruction to a controller on the basis of pre-acquired node information from the controller, wherein the controller is used for controlling network nodes, the node information includes information of the network nodes, the adjustment instruction is used for instructing the controller to adjust the working state of some network nodes included among the network nodes on the basis of information included in the adjustment instruction, and the quantity of the network nodes is one or more;

a second sending module 154, configured to send an interference measurement instruction to a target terminal, wherein the interference measurement instruction is used for instructing the target terminal to measure the interference of the network nodes currently in the working state on the basis of information included in the interference measurement instruction, so as to obtain a measurement result; and a first determination module 156, configured to acquire the measurement result fed back by the target terminal, and determine an interference state between the network nodes on the basis of the measurement result.

In an alternative embodiment, the adjustment instruction includes at least one piece of the following information:

the quantity of continuous frames or slots required in an interference detection period; the frame number at the start of the interference detection period;

the serial number and the quantity of the network nodes which need to be switched on for detection;

a switching time interval of each of the network nodes controlled by the controller;

a codebook switching instruction of each of the network nodes controlled by the controller; and a switch-off period state of each of the network nodes controlled by the controller.

In an alternative embodiment, the interference measurement instruction includes at least one piece of the following information:

start time of interference measurement, a duration of interference measurement, measurement times of interference measurement, and end time of interference measurement.

In an alternative embodiment, the first determination module 156 is configured to acquire the measurement result fed back by the target terminal in the following manner: acquiring the measurement result fed back by the target terminal according to one of the following manners: the target terminal separately reports a measurement result obtained after measuring the interference of each codebook of the network nodes on the target terminal: the target terminal reports, in batches, measurement results obtained after measuring the interference of each codebook of the network nodes on the target terminal; and the target terminal reports, as a whole, a measurement result obtained after measuring the interference of each codebook of the network nodes on the target terminal.

In an alternative embodiment, the second sending module 154 is configured to send the interference measurement instruction to the target terminal in the following manner: sending the interference measurement instruction to the target terminal via one of the following signaling: a Channel State Information Reference Signal (CSI-RS), a Synchronization Signal Block (SSB), a Physical Downlink Shared Channel (PDSCH), and Media Access Control (MAC) signaling.

In an alternative embodiment, the first determination module 156 is configured to acquire the measurement result fed back by the target terminal in the following manner: acquiring the measurement result fed back by the target terminal via one of the following signaling: a Channel Sounding Reference Signal (SRS), a Physical Downlink Shared Channel (PDSCH), and a Media Access Control (MAC).

In an alternative embodiment, the apparatus further includes: a third sending module, configured to send a broadcast signal before sending the adjustment instruction to the controller on the basis of the pre-acquired node information from the controller; and a receiving module, configured to receive the node information fed back by the controller on the basis of the broadcast signal.

In an alternative embodiment, the broadcast signal includes at least one of the following:

a signaling flag for indicating network node-dedicated control signaling;

at least one of a control signaling sending period, a sending interval and a sending slot;

a switch-on and/or switch-off instruction of the network nodes; and a cell identifier (ID).

In an alternative embodiment, the third sending module is configured to send the broadcasting signal in the following manner:

sending the broadcast signal via one of the following signaling: a Synchronization Signal Block (SSB), and paging.

In an alternative embodiment, the receiving module is configured to receive the node information fed back by the controller on the basis of the broadcast signal in the following manner: receiving the node information fed back by the controller via one of the following signaling: a Random Access Channel (RACH), Radio Resource Control (RRC) signaling, Media Access Control (MAC) signaling, and UE capability signaling.

In an alternative embodiment, the node information includes at least one of the following:

the quantity of network nodes controlled by the controller;

the serial number of each of the network nodes;

the type of each of the network nodes;

the current working state of each of the network nodes;

the activation state of each of the network nodes;

configuration information of each of the network nodes;

deployment information of each of the network nodes;

performance information of each of the network nodes; and a unique identification of each of the network nodes.

In an alternative embodiment, the apparatus further includes a fourth determination module, configured to, after determining an interference state between the network nodes on the basis of the measurement result, determine, on the basis of the interference state, a plurality of target network nodes of which the interference correlation value exceeds a predetermined threshold; and a first interference suppression module, configured to perform, by the controller, interference suppression on the interference between the plurality of target network nodes.

In an alternative embodiment, the first interference suppression module is configured to perform, by the controller, interference suppression on the interference between the target network nodes in at least one of the following manners:

controlling, by the controller, the plurality of target network nodes to work at different times;

controlling, by the controller, some target network nodes included among the plurality of target network nodes to perform codebook switching; and adjusting, by the controller, physical parameters of some target network nodes included among the plurality of target network nodes.

In an alternative embodiment, the first interference suppression module is configured to control, by the controller, some target network nodes included among the plurality of target network nodes to perform codebook switching in the following manner, including:

sending a first codebook adjustment instruction to the controller, so as to instruct the controller to control some target network nodes included among the plurality of target network nodes to perform codebook switching; or, sending codebook scanning set signaling to the controller, so as to instruct the controller to perform codebook scanning on the plurality of target network nodes in a scanning mode indicated by the codebook scanning set signaling: determining, on the basis of a scanning result reported by the controller, a target codebook to which some target network nodes included among the plurality of target network nodes are to be switched; and sending a second codebook adjustment instruction to the controller, so as to instruct the controller to control some target network nodes included among the plurality of target network nodes to be switched to the target codebook.

In an alternative embodiment, the first codebook adjustment instruction and/or the second codebook adjustment instruction is sent via at least one of the following signaling:

a Physical Downlink Shared Channel (PDSCH), an MAC Control Element (MAC CE), Radio Resource Control (RRC) signaling, and a control plane-dedicated instruction.

In an alternative embodiment, the first interference suppression module is configured to adjust, by the controller, physical parameters of some target network nodes included among the plurality of target network nodes in the following manner:

sending a mechanical adjustment instruction to the controller, so as to instruct the controller to adjust physical parameters of some target network nodes included among the plurality of target network nodes, wherein the mechanical adjustment instruction includes at least one of the following:

the serial number and the quantity of the target network nodes which need to be adjusted;

at least one of the following adjustment amounts of each of the target network nodes to be adjusted; a downtilt angle adjustment amount, a horizontal angle adjustment amount, a rotation angle adjustment amount relative to a normal line, and a height adjustment amount; and at least one of the following parameters of each of the target network nodes; an array activation state, an array activation state quantity, and an array activation form.

In an alternative embodiment, the network nodes include one of the following:

a Reconfigurable Intelligent Surface (RIS), and a Network-Controlled Repeater (repeater for short).

Figure 16:
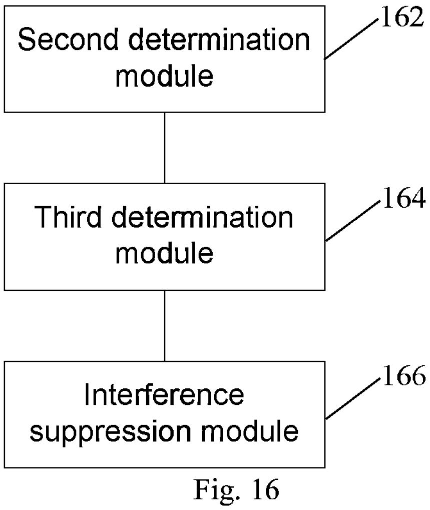
FIG. 16 is a structural block diagram of an interference suppression apparatus according to an embodiment of the present disclosure.

FIG. 16 is a structural block diagram of an interference suppression apparatus according to an embodiment of the present disclosure. As shown in FIG. 16, the apparatus includes:

a second determination module 162, configured to determine an interference state between network nodes controlled by a controller;

a third determination module 164, configured to determine, on the basis of the interference state, a plurality of target network nodes of which the interference correlation value exceeds a predetermined threshold; and an interference suppression module 166, configured to perform, by the controller, interference suppression on the interference between the plurality of target network nodes.

In an alternative embodiment, the interference suppression module 166 (which may be the same as or different from the first interference suppression module) is configured to perform, by the controller, interference suppression on the interference between the target network nodes in at least one of the following manners:

controlling, by the controller, the plurality of target network nodes to work at different times;

controlling, by the controller, some target network nodes included among the plurality of target network nodes to perform codebook switching; and adjusting, by the controller, physical parameters of some target network nodes included among the plurality of target network nodes.

In an alternative embodiment, the interference suppression module 166 may control, by the controller, some target network nodes included among the plurality of target network nodes to perform codebook switching in the following manner: sending a first codebook adjustment instruction to the controller, so as to instruct the controller to control some target network nodes included among the plurality of target network nodes to perform codebook switching; or, sending codebook scanning set signaling to the controller, so as to instruct the controller to perform codebook scanning on the plurality of target network nodes in a scanning mode indicated by the codebook scanning set signaling: determining, on the basis of a scanning result reported by the controller, a target codebook to which some target network nodes included among the plurality of target network nodes are to be switched; and sending a second codebook adjustment instruction to the controller, so as to instruct the controller to control some target network nodes included among the plurality of target network nodes to be switched to the target codebook.

In an alternative embodiment, the first codebook adjustment instruction and/or the second codebook adjustment instruction is sent via at least one of the following signaling: a Physical Downlink Shared Channel (PDSCH), a Media Access Control Control Element (MAC CE), Radio Resource Control (RRC) signaling, and a control plane-dedicated instruction.

In an alternative embodiment, the interference suppression module 166 may adjust, by the controller, physical parameters of some target network nodes included among the plurality of target network nodes in the following manner: sending a mechanical adjustment instruction to the controller, so as to instruct the controller to adjust physical parameters of some target network nodes included among the plurality of target network nodes, wherein the mechanical adjustment instruction includes at least one of the following: the serial number and the quantity of the target network nodes which need to be adjusted; at least one of the following adjustment amounts of each of the target network nodes to be adjusted; a downtilt angle adjustment amount, a horizontal angle adjustment amount, a rotation angle adjustment amount relative to a normal line, and a height adjustment amount; and at least one of the following parameters of each of the target network nodes; an array activation state, an array activation state quantity, and an array activation form.

In an alternative embodiment, the network nodes may include one of the following: a Reconfigurable Intelligent Surface (RIS), and a Network-Controlled Repeater (repeater for short).

It should be noted that the described various module may be implemented by software or hardware. The latter may be implemented in the following manner, but is not limited thereto: all the modules are located in the same processor; or the various modules are located in different processors in arbitrary combinations.

Further provided in the embodiments of the present disclosure is a computer readable storage medium, the computer readable storage medium storing a computer program, wherein the computer program is configured to execute the steps in any one of the described method embodiments when running.

In an exemplary embodiment, the computer readable storage medium may include, but is not limited to, any medium that can store a computer program, such as a USB flash disk, a Read-Only Memory (ROM), a Random Access Memory (RAM), a mobile hard disk, a magnetic disk, or an optical disk.

Further provided in the embodiments of the present disclosure is an electronic device, including a memory and a processor, wherein the memory stores a computer program, and the processor is configured to run the computer program so as to execute the steps in any of the described method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the described embodiments and exemplary implementations, and details are not repeatedly described in this embodiment.

Obviously, those skilled in the art should understand that various modules or various steps in the embodiments of the present disclosure can be implemented by a universal computing apparatus, and the various modules or steps can be integrated on a single computing apparatus or distributed over a network formed by a plurality of computing apparatuses, and can be implemented by program codes executable by the computing apparatus, so that the modules or steps can be stored in a storage apparatus and executed by the computing apparatus, and the shown or described steps can be executed in sequences different from those described here in some cases, or the various modules or steps can be implemented by manufacturing the modules or steps into various integrated circuit modules respectively, or manufacturing multiple modules or steps among the various modules or steps into a single integrated circuit module. Thus, the present disclosure is not limited to any specific combination of hardware and software.

The above description is only the preferred embodiments of the present disclosure, and is not intended to limit the present disclosure. For those skilled in the art, the present disclosure may have various modifications and variations. Any modifications, equivalent replacements, improvements and the like made within the principle of the present disclosure shall belong to the protection scope of the present disclosure.

The invention claimed is:

1. An interference detection method, comprising:

sending an adjustment instruction to a controller on the basis of pre-acquired node information from the controller, wherein the controller is used for controlling network nodes, the node information comprises information of the network nodes, the adjustment instruction is used for instructing the controller to adjust the working state of some network nodes comprised among the network nodes on the basis of information comprised in the adjustment instruction, and the quantity of the network nodes is one or more;

sending an interference measurement instruction to a target terminal, wherein the interference measurement instruction is used for instructing the target terminal to measure the interference of the network nodes currently in the working state on the basis of information comprised in the interference measurement instruction, so as to obtain a measurement result; and acquiring the measurement result fed back by the target terminal, and determining an interference state between the network nodes on the basis of the measurement result.

2. The method according to claim 1, wherein the adjustment instruction comprises at least one piece of the following information:

the quantity of continuous frames or slots required in an interference detection period;

the frame number at the start of the interference detection period;

the serial number and the quantity of the network nodes which need to be switched on for detection;

a switching time interval of each of the network nodes controlled by the controller;

a codebook switching instruction of each of the network nodes controlled by the controller; and a switch-off period state of each of the network nodes controlled by the controller;

or, wherein the interference measurement instruction comprises at least one piece of the following information:

start time of interference measurement, a duration of interference measurement, measurement times of interference measurement, and end time of interference measurement.

3. The method according to claim 1, wherein acquiring the measurement result fed back by the target terminal comprises:

acquiring the measurement result fed back by the target terminal according to one of the following manners:

the target terminal separately reports a measurement result obtained after measuring the interference of each codebook of the network nodes on the target terminal;

the target terminal reports, in batches, measurement results obtained after measuring the interference of each codebook of the network nodes on the target terminal; and the target terminal reports, as a whole, a measurement result obtained after measuring the interference of each codebook of the network nodes on the target terminal;

or, wherein sending the interference measurement instruction to the target terminal comprises:

sending the interference measurement instruction to the target terminal via one of the following signaling:

a Channel State Information Reference Signal (CSI-RS), a Synchronization Signal Block (SSB), a Physical Downlink Shared Channel (PDSCH), and Media Access Control (MAC) signaling;

or, wherein acquiring the measurement result fed back by the target terminal comprises:

acquiring the measurement result fed back by the target terminal via one of the following signaling:

a Channel Sounding Reference Signal (SRS), a Physical Downlink Shared Channel (PUSCH), and a Media Access Control (MAC).

4. The method according to claim 1, wherein before sending the adjustment instruction to the controller on the basis of the pre-acquired node information from the controller, the method further comprises:

sending a broadcast signal; and receiving the node information fed back by the controller on the basis of the broadcast signal.

5. The method according to claim 4, wherein the broadcast signal comprises at least one of the following:

a signaling flag for indicating network node-dedicated control signaling;

at least one of a control signaling sending period, a sending interval and a sending slot;

a switch-on and/or switch-off instruction of the network nodes; and a cell identifier (ID);

or, wherein sending the broadcast signal comprises:

sending the broadcast signal via one of the following signaling:

a Synchronization Signal Block (SSB), and paging;

or, wherein receiving the node information fed back by the controller on the basis of the broadcast signal comprises:

receiving the node information fed back by the controller via one of the following signaling:

a Random Access Channel (RACH), Radio Resource Control (RRC) signaling, Media Access Control (MAC) signaling, and UE capability signaling.

6. The method according to claim 1, wherein the node information comprises at least one of the following:

the quantity of network nodes controlled by the controller;

the serial number of each of the network nodes;

the type of each of the network nodes;

the current working state of each of the network nodes;

the activation state of each of the network nodes;

configuration information of each of the network nodes;

deployment information of each of the network nodes;

performance information of each of the network nodes; and a unique identification of each of the network nodes.

7. The method according to claim 1, wherein after determining an interference state between the network nodes on the basis of the measurement result, the method further comprises:

determining, on the basis of the interference state, a plurality of target network nodes of which the interference correlation value exceeds a predetermined threshold; and performing, by the controller, interference suppression on the interference between the plurality of target network nodes.

8. The method according to claim 7, wherein performing, by the controller, interference suppression on the interference between the target network nodes comprises at least one of the following manners:

controlling, by the controller, the plurality of target network nodes to work at different times;

controlling, by the controller, some target network nodes comprised among the plurality of target network nodes to perform codebook switching; and adjusting, by the controller, physical parameters of some target network nodes comprised among the plurality of target network nodes.

9. The method according to claim 8, wherein controlling, by the controller, some target network nodes comprised among the plurality of target network nodes to perform codebook switching comprises:

sending a first codebook adjustment instruction to the controller, so as to instruct the controller to control some target network nodes comprised among the plurality of target network nodes to perform codebook switching; or, sending codebook scanning set signaling to the controller, so as to instruct the controller to perform codebook scanning on the plurality of target network nodes in a scanning mode indicated by the codebook scanning set signaling; determining, on the basis of a scanning result reported by the controller, a target codebook to which some target network nodes comprised among the plurality of target network nodes are to be switched; and sending a second codebook adjustment instruction to the controller, so as to instruct the controller to control some target network nodes comprised among the plurality of target network nodes to be switched to the target codebook.

10. The method according to claim 9, wherein the first codebook adjustment instruction and/or the second codebook adjustment instruction is sent via at least one of the following signaling:

a Physical Downlink Shared Channel (PDSCH), a Media Access Control Control Element (MAC CE), Radio Resource Control (RRC) signaling, and a control plane-dedicated instruction.

11. The method according to claim 8, wherein adjusting, by the controller, physical parameters of some target network nodes comprised among the plurality of target network nodes comprises:

sending a mechanical adjustment instruction to the controller, so as to instruct the controller to adjust physical parameters of some target network nodes comprised among the plurality of target network nodes, wherein the mechanical adjustment instruction comprises at least one of the following:

the serial number and the quantity of the target network nodes which need to be adjusted;

at least one of the following adjustment amounts of each of the target network nodes to be adjusted: a downtilt angle adjustment amount, a horizontal angle adjustment amount, a rotation angle adjustment amount relative to a normal line, and a height adjustment amount; and at least one of the following parameters of each of the target network nodes: an array activation state, an array activation state quantity, and an array activation form.

12. The method according to claim 1, wherein the network nodes comprise one of the following:

a Reconfigurable Intelligent Surface (RIS), and a Network-Controlled Repeater (repeater for short).

13. An interference detection apparatus, comprising:

a first sending module, configured to send an adjustment instruction to a controller on the basis of pre-acquired node information from the controller, wherein the controller is used for controlling network nodes, the node information comprises information of the network nodes, the adjustment instruction is used for instructing the controller to adjust the working state of some network nodes comprised among the network nodes on the basis of information comprised in the adjustment instruction, and the quantity of the network nodes is one or more;

a second sending module, configured to send an interference measurement instruction to a target terminal, wherein the interference measurement instruction is used for instructing the target terminal to measure the interference of the network nodes currently in the working state on the basis of information comprised in the interference measurement instruction, so as to obtain a measurement result; and a first determination module, configured to acquire the measurement result fed back by the target terminal, and determine an interference state between the network nodes on the basis of the measurement result.

14. A non-transitory computer readable storage medium, the computer readable storage medium storing a computer program, wherein the computer program is configured to, when executed by a processor, implement the steps of the method as claimed in claim 1.

15. An electronic device, comprising a memory, a processor, and a computer program stored in the memory and executable on the processor, wherein the processor is configured to execute the computer program to implement the steps of the method as claimed in claim 1.

* * * * *